Mar. 6, 1923.
R. PETTIT.
RIVETING TOOL.
FILED APR. 22, 1921.
1,447,819.
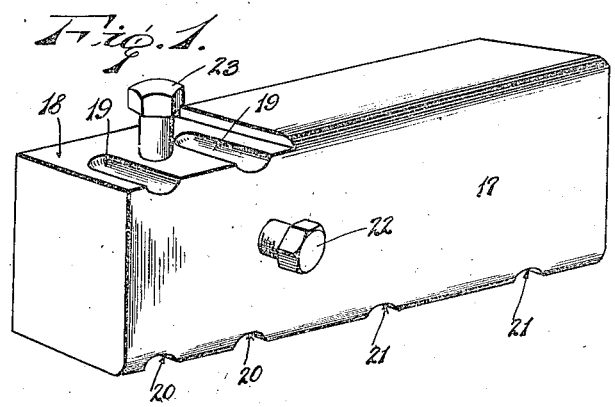
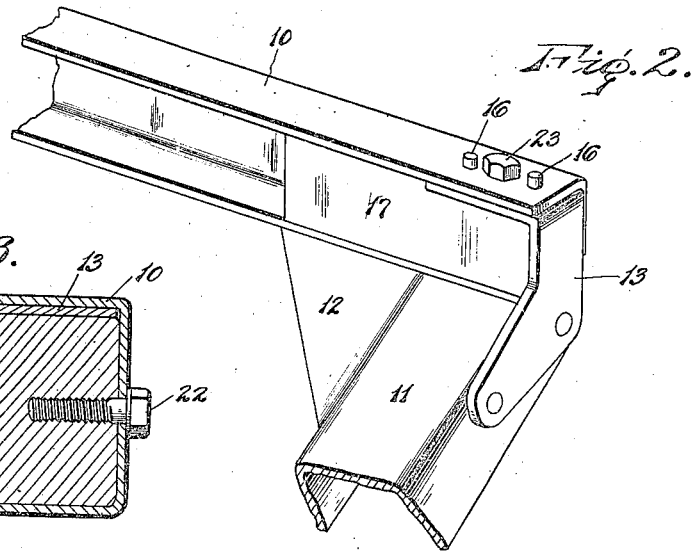
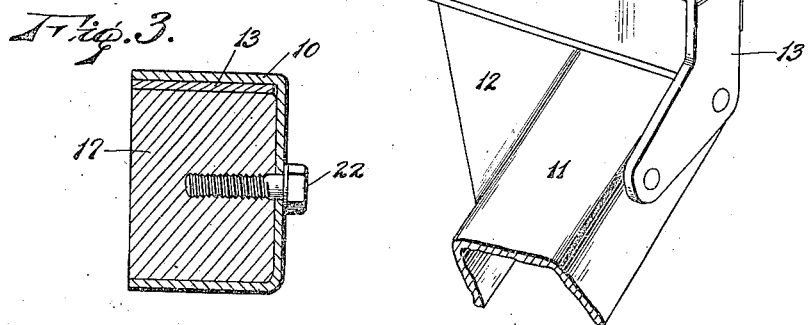
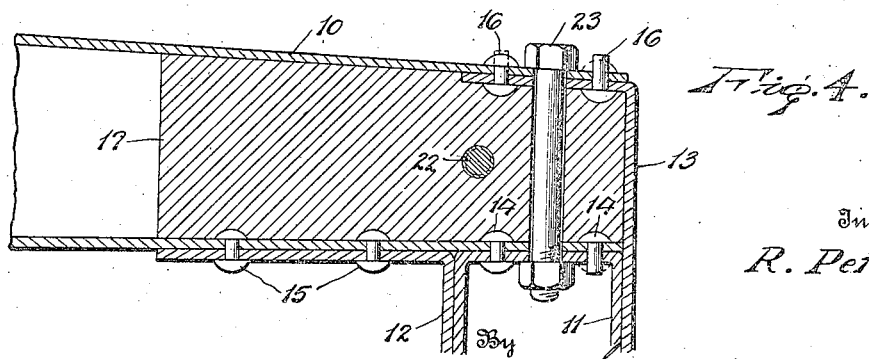
Inventor
R. Pettit.
By Larry Lacey, Attorneys Patented Mar. 6, 1923.

1,447,819

UNITED STATES PATENT OFFICE.

RAY PETTIT, OF FREMONT, NEBRASKA.

RIVETING TOOL.

Application filed April 22, 1921. Serial No. 463,704.

*To all whom it may concern:*

Be it known that I, RAY PETTIT, a citizen of the United States, residing at Fremont, in the county of Dodge and State of Nebraska, have invented certain new and useful Improvements in Riveting Tools, of which the following is a specification.

This invention relates to an improved riveting anvil particularly designed for use in repairing the chassis frames of Ford automobiles and has as one of its principal objects to provide a device of this character whereby the front cross member of the frame of a Ford vehicle may be readily riveted in place.

The invention has as a further object to provide an anvil which may be temporarily secured in position and which, when in place, will serve to block displacement of the securing rivets, coacting therewith so that said rivets may be conveniently upset.

And the invention has as a still further object to provide a device wherein the means employed for temporarily securing the anvil in place will also serve as a temporary fastening means for the cross member being riveted for holding said cross member in proper position during the riveting operation.

Other and incidental objects will appear hereinafter.

In the drawing:

Figure 1 is a perspective view of my improved anvil,

Figure 2 is a fragmentary perspective view showing the anvil in connection with one side member and the front cross member of the frame of a Ford vehicle, Figure 3 is a transverse section through the device, and Figure 4 is a longitudinal section showing the manner in which the anvil is adapted to sustain the rivets employed for securing the front cross member to the adjacent side member of the frame.

It is at present often necessary to replace the front cross member of the frame of a Ford vehicle. However, under present practice, it is very difficult to upset the rivets employed for securing the cross member, due to the fact that no suitable tool is provided which will fit in the channels of the side members of the frame behind the rivets. Accordingly, the rivets can be only imperfectly supported during the upsetting operation, often resulting not only in premature looseness of the rivets but also involving considerable loss of time and labor. The present invention, therefore, seeks to provide a device which will overcome these disadvantages and a device which will render it readily possible to apply the rivets.

Referring now more particularly to the drawing, I have, for convenience, shown the left side member 10 of the frame of a Ford vehicle, the right side member being, of course, identical. Extending between said members at their forward ends is a front cross member 11 to the adjacent end portion of which is riveted a corner bracket 12 as well as a second front bracket 13. A pair of rivets 14 is employed for securing the cross member to the lower flange of the side member while a pair of rivets 15 is employed for securing the corner bracket 12 to said flange. Similarly, a pair of rivets 16 is employed for securing the bracket 13 to the upper flange of the side member, and it is to facilitate the operation of upsetting these rivets that the present invention is provided. In the present instance, I have shown the anvil constructed for use in connection with the left side member. A similar right anvil is also provided. However, since the right and left anvils are identical with the exception that one is designed for use in connection with one side member and the other is designed for use in connection with the other side member of the frame of the vehicle, a description of the left anvil will suffice for both. In carrying the invention into effect, I employ an oblong body block 17 which is tapered toward one end thereof and is rectangular in cross section, being, as illustrated, adapted to freely fit in the channel of the side member 10. At one end, the body block is cut away at its upper side to provide a seat 18 accommodating the rearwardly projecting end of the bracket 13, which end of the bracket extends rearwardly within the side member 10 beneath the upper flange thereof. Formed in said seat is a pair of spaced transverse grooves 19 accommodating the heads of the rivets 16. Formed in the lower side face of the block opposite the grooves 19 is a pair of similar grooves 20 accommodating the heads of the rivets 14. The lower side face of the block is further provided with a similar pair of spaced transverse grooves 21 accommodating the heads of the rivets 15. All of these grooves open through the inner side face of the block so that after the rivets have been initially fitted in place, the block may be moved into the channel of the side member 10 over the heads of the rivets for blocking displacement of the rivets. The vertical wall of the side member 10, as commonly constructed, is provided near its forward end with a pair of spaced openings for receiving the securing bolts of one of the front fender brackets and one of these openings is employed to accommodate a cap bolt 22 which is threaded into the body block and may, as will be perceived, be adjusted for drawing the block tightly into the channel of the side member. Further, the top and bottom flanges of the side member, as commonly constructed, as well as the rearwardly projecting end of the bracket 13 and the transverse web of the front cross member, are provided with registering openings for receiving one of the radiator securing bolts. These registering openings are, as shown in Figure 3, employed to accommodate a clamping bolt 23 which may be adjusted for tightly binding the side flanges of the member 10 against the block and accordingly binding the heads of the rivets within the grooves 19, 20 and 21. Thus, as will be seen, after the rivets have been initially fitted in place and the bolts 22 and 23 have been tightened, a suitable upsetting tool may be engaged with the outer ends of the rivets for upsetting the rivets, the anvil, of course, serving to rigidly sustain the rivets during the upsetting operation. I accordingly provide a particularly efficient device for the purpose set forth and a device which will greatly facilitate the operation of riveting the front cross member of the frame of a Ford vehicle in place.

Having thus described the invention, what is claimed as new is:

1. An anvil of the character described including a body block tapered to fit between the sides of a channel side member of a vehicle frame forming an abutment for fastening devices extending through said sides.

2. An anvil of the character described including a body block shaped to fit in the forward end portion of a channel side member of a vehicle frame, and means adjustable upon the block to coact with the member for drawing the block into the channel of the member.

3. An anvil of the character described including a body block tapered to fit in the forward end portion of a channel side member of a vehicle frame, and clamping means carried by the block to extend through said member.

4. An anvil of the character described including a body block shaped to fit in the forward end portion of a channel side member of a vehicle frame, and a clamping bolt carried by the block to extend through the block and said member.

5. An anvil of the character described including a body block tapered to fit in the forward end portion of a channel side member of a vehicle frame and formed with grooves to accommodate the heads of rivets extending through said member.

6. An anvil of the character described including a body block tapered to fit between the sides of a channel side member of a vehicle frame, and a clamping bolt extending through the block and the sides of said member.

In testimony whereof I affix my signature.

RAY PETTIT. [L. S.]